United States Patent
Sumroy et al.

(10) Patent No.: US 9,332,815 B2
(45) Date of Patent: May 10, 2016

(54) CLASP

(71) Applicants: Jon Sumroy, Raanana (IL); Frank Schenk, Tel Aviv (IL); Ran Litvak, Tel Aviv (IL); Yoav Tikochinsky, Tel Aviv (IL)

(72) Inventors: Jon Sumroy, Raanana (IL); Frank Schenk, Tel Aviv (IL); Ran Litvak, Tel Aviv (IL); Yoav Tikochinsky, Tel Aviv (IL)

(73) Assignee: Carfoldio LTD., Raanana (IL)

(*) Notice: Subject to any disclaimer, the term of this patent is extended or adjusted under 35 U.S.C. 154(b) by 25 days.

(21) Appl. No.: 13/973,181

(22) Filed: Aug. 22, 2013

(65) Prior Publication Data

US 2015/0052709 A1    Feb. 26, 2015

(51) Int. Cl.
| | |
|---|---|
| *A45C 13/10* | (2006.01) |
| *A44C 5/24* | (2006.01) |
| *B60R 22/10* | (2006.01) |
| *A44C 5/14* | (2006.01) |
| *A44C 5/20* | (2006.01) |

(52) U.S. Cl.
CPC .............. *A45C 13/1069* (2013.01); *A44C 5/14* (2013.01); *A44C 5/2042* (2013.01); *A44C 5/243* (2013.01); *B60R 22/105* (2013.01); *A44D 2203/00* (2013.01); *A44D 2205/00* (2013.01); *Y10T 24/32* (2015.01)

(58) Field of Classification Search
CPC .... Y10T 292/11; Y10T 24/32; A45D 40/222; E05C 19/16; A45C 13/1069; B60R 22/105; A44C 5/243; A44C 5/14; A44C 5/2042; A44D 2205/00; A44D 2203/00
USPC .......................... 24/303; 292/251.5; 335/306
See application file for complete search history.

(56) References Cited

U.S. PATENT DOCUMENTS

| | | | |
|---|---|---|---|
| 5,367,891 A | 11/1994 | Furuyma | |
| 5,724,225 A * | 3/1998 | Hrusoff et al. | ........... 361/679.55 |
| 6,640,398 B2 | 11/2003 | Hoffman | |
| 7,889,036 B2 | 2/2011 | Fiedler | |
| 8,009,002 B2 | 8/2011 | Fiedler | |
| 8,555,470 B2 * | 10/2013 | Spataro et al. | ............... 24/599.9 |
| 2005/0023841 A1 * | 2/2005 | Chen | ......................... 292/251.5 |
| 2012/0044031 A1 | 2/2012 | Ninomiya | |
| 2013/0038988 A1 * | 2/2013 | Chen et al. | ............... 361/679.01 |

FOREIGN PATENT DOCUMENTS

EP    2436280    4/2012

* cited by examiner

*Primary Examiner* — Robert J Sandy
*Assistant Examiner* — Michael Lee
(74) *Attorney, Agent, or Firm* — Robert G. Lev

(57) ABSTRACT

A locking device includes a flap configured to swing on a hinge towards a base, the flap having a tongue at a distal end thereof and the base having a housing at a distal end thereof, wherein the tongue is forced into the housing and is locked in place using a mechanical catch; the flap and the housing each being provided with a pair of magnets, those magnets on the housing being attached to a slider that is able to slidingly reciprocate between an open position and a closed position.

4 Claims, 4 Drawing Sheets

CLASP

BACKGROUND

There are a number of magnetic catches and closures on the market. The simplest of these are magnets for holding swing doors closed. Such catches are often deployed on kitchen cabinets and the like.

Magnets may also be used, like a spring, to resist the closure of a door or catch. Since magnets are polar, by deploying magnets on a pair of surfaces, the surfaces can be made to attract or repel each other.

EP2436280 to Fiedler Joachim, titled "Mechanical-magnetic connection structure" describes a closure consisting of connecting modules for connecting two elements, and comprising tubular or grooved guide sections, which are configured to be inserted into one another. Permanent magnets are arranged on a base of the guide sections, where the guide sections made of ferromagnetic materials exhibit circular cross section. One permanent magnet is fixed in one of the guide sections, and another permanent magnet is arranged to moved in a such a manner that the latter magnet automatically self-aligns in a pulling position in relation to former magnet when the closure is closed. It appears that in the described and claimed devices, a resistive force is provided by a spring. The specification states that the term spring is not to be taken as necessarily meaning a helical spring, and may be a springy foam, for example. The term does, however, relate to a mechanical, Hookian element, and not to a magnet.

U.S. Pat. No. 7,889,036 to Fiedler Joachim describes a "Magnetic Holding Device" which relates to a universally-applicable, detachable magnetic catch, suitable, for example, for the closing and opening of containers of for fixing or releasing an object, whereby each magnet is held with a positive fit in the recess of a holder. One of said holders may be displaced by means of an operating device such that the magnetic poles of the magnets oppose each other to be either attracting or repelling. Each magnet has an upper side, an underside, parallel to the above and a circumferential surface at an angle of 90 to the upper and underside. The upperside and the underside of the magnet are a non-symmetrical planar surface and the recess of the holder has a horizontal cross-sectional surface, identical to the non-symmetrical form of the upperside and the underside such that the magnet may only be introduced into the corresponding recess with the poles in a functional alignment. Thus U.S. Pat. No. 7,889,036 describes a mechanic flap that is lockable by oppositely aligned magnets N-S S-N, which can be brought into alignment N-N S-S to release.

The locking force is purely magnetic. Thus once the magnets are overcome the lock may be opened. There is no mechanical safety catch of any sort.

WO2005094625 (U.S. Pat. No. 8,009,002) titled "Detachable Magnet Holder" also to Fiedler Joachim relates to a universally applicable detachable magnet holder with a fixed magnet and an opposite-lying magnet which can rotate about a point of rotation and which is provided with magnet pole surfaces, wherein each magnet pole surface comprises at least two poles which, when closed, attract each other and which, when open, repel each other once the rotatable magnet has been rotated by means of an actuation device. According to the invention, a distance element made of a non-ferromagnetic material, is fixed to one of the magnet pole surfaces, whereby the bearing surface on the opposite magnet pole surface is a maximum ⅓ of the surface and a centering engaging device (10a, 10b, 11) is arranged in the vicinity of the magnet poles in order to receive magnetic sheer forces.

The magnets provide the locking force. The magnets are rotated. US2012044031 to Ninomiya Tomoyasu titled 'Magnetic Connector describes a magnetic connecting device, which is easily separated without both hands but one that is not easily separated in a direction in which a pulling force is applied, is disclosed. Each of a pair of coupling pieces is respectively provided with each of a pair of coupling piece main bodies including joint surfaces capable of joining each other. At least one magnet piece is embedded in each of the joint surfaces such that the coupling piece main bodies attract to join each other. An attaching piece for attaching a string body is provided on each of the coupling pieces, and is provided with a slide guide structure formed on a side of the joint surface of each of the coupling piece main bodies for slidingly guiding the other in a predetermined direction with respect thereto.

This application is directed to jewellery and the like. The two sides of the couple have string holders—i.e. loops for engaging straps or belts. There are magnets for holding the elements together but also a mechanical dovetail or mortis to take the strain.

The concept of sliding to release, to align N-N S-S or at least to displace a N-S and align a second magnet is discussed. The strain to be overcome by the catch is in plane rather than tangential thereto. The two parts are twisted apart.

U.S. Pat. No. 5,367,891 to Furuyama Kazuo, titled "Fitting Device for Accessory" describes a fitting device for an ornamental accessory that is made up of a pair of connecting members each having a cylindrical portion on an end to be fitted together in a rotatable manner relative to each other. One of the connecting members has at its fitting end at least one piece of guide grooves formed in series. The guide groove is made up of a thrust groove which is open into an outside and extends in an axial direction of the connecting member, a rotation groove which bends from an inner end of the thrust groove and extends in a circumferential direction, and a fixing groove which bends from that end of the rotation groove which is away from the thrust groove towards the fitting end. The other of the connecting members has at its fitting end a projection which is thrusted into the thrust groove and moves along the rotation groove. The projection is positioned to correspond to the guide groove. Each of the connecting members has inside its fitting end portion magnet pieces disposed on a plane. The magnet pieces have N pole and S pole arranged to lie alternately in a circumferential direction to form magnetized surfaces facing outwards. This patent is directed to a bayonet clip for a necklace or similar, with a four way magnetic head to help alignment and to provide extra security.

U.S. Pat. No. 6,640,398 to Hoffman Leslie C titled "Magnetic Clasp for Jewelry" relates to magnetic clasps for securing the opposed ends of chains and other jewelry. Each clasp includes an arrangement for securing separable bodies by means of magnets that have been poled to present opposed surfaces of opposite magnetic polarities. In a first embodiment, disk-like magnets are received in channels of mating elongated body members of like configuration. End flanges of the elongated body members, in addition to the disk-like magnets, provide axial resistance to separation while the resultant magnetic force prevents separation in the transverse direction. In a second embodiment, disk-like magnets of divided polarities are seated at ends of mating bodies. A pin-and-slot locking mechanism is formed in the two bodies and the magnets are oriented relative thereto so that resultant repulsive magnetic forces force the two magnets into mating alignment when in the longitudinal slot for maximum magnetic holding force. In a third embodiment, magnetic disks are held side-by-side by holders within a split hemispherical housing.

Despite the wide range of magnetic and mechanical fastenings, there is a need for specialist fastenings with unique features.

SUMMARY OF THE INVENTION

A first aspect of the invention is directed to a locking device comprising a flap that is configured to swing on a hinge towards a base, the flap having a tongue at a distal end thereof and the base having a housing at a distal end thereof, wherein if the tongue is forced into the housing it is locked in place using a mechanical catch; the flap and the housing are each provided with a pair of magnets such that the pair of magnets on the flap are fixed to the flap, whereas those on the housing are attached to a slider that is able to slidingly reciprocate between an open position and a closed position, such that whilst the flap is swinging towards the base, the slider is in the open position and the magnets on the slider are mounted in repelling configuration with respect to the magnets on the flap to provide a repellant force that tends to urge the flap away from the housing, however, when the flap is positioned within the housing in the closed position, the magnetic attraction of the magnets on the flap for the magnets on the slider cause the slider to slide into a closed position wherein a mechanical clasp holds the flap closed, such that sliding the slider to release the mechanical clasp brings the magnets on the slider into repelling alignment with the magnets on the flap causing the flap to spring open.

In some embodiments, the flap is hinged to the housing.

Optionally, a loop for a strap is coupled to the housing.

Optionally, closing the flap into a housing creates a closed loop for engaging a strap.

Optionally the locking device is a lock for an article that is worn.

For example, the article may be a watch strap or a ski boot.

In a second embodiment, the flap is hinged to a lid that is hinged to a case, and the housing is hinged to the case, such that when the lid of the case is closed, the flap and housing are brought into aligning proximity such that swinging the flap on its hinge brings it into the housing.

Optionally, the case is a case for a musical instrument.
Optionally, the case is a case for electronic equipment.
Optionally, the case is a case for a traveler's belongings.
Optionally, the case is a cupboard or cabinet.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF EMBODIMENTS

Figure 1:
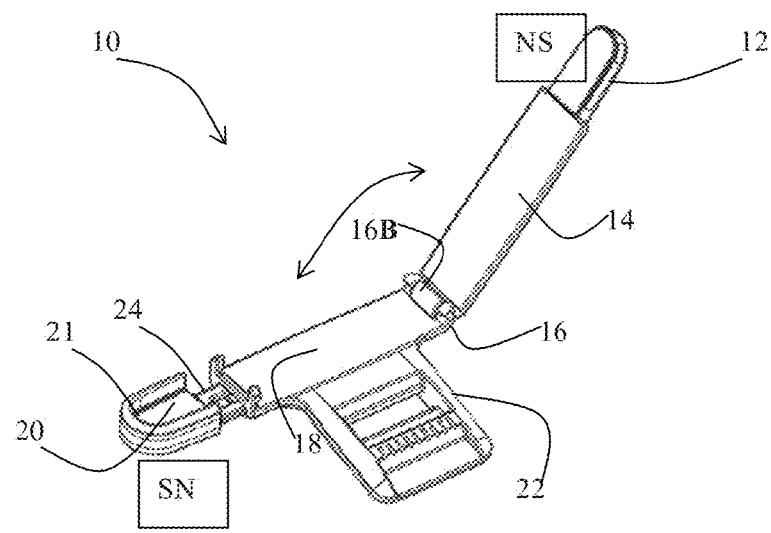
FIG. 1 shows a clasp of the invention in accordance with one embodiment, having magnets on a slider configured to repel, resisting closing.

With reference to FIG. 1, the present invention is directed to a clasp 10 consisting of a base 18 and a flap 14 coupled by a hinge 16 consisting of a hinge pin 16A (see FIGS. 5 and 6) in a housing 16B. On the end of the flap 14 there is provided a tongue 12 containing a pair of magnets with opposed polarity arranged side by side. As shown, the magnet more proximal to the hinge 16 may be have a North seeking pole facing upwards, and the second magnet, more distal to the hinge 16 may have a South seeking pole facing upwards. On the end of the base 18, there is provided a slider 24 that may be slid in and out of the base 18 by pushing and pulling on the housing 20 of the slider 24. The lip 21 of the housing 20 extends inwards and it the tongue is positioned within the housing 20, the slider may be slid inwards such that the lip 21 of the housing serves as a mechanical catch that engages the tongue 12 12, holding it within the housing 20. Within the head of the slider are a pair of magnets arranged such that the magnet more proximal to the hinge 16 may be have a North seeking pole facing upwards, and the second magnet, more distal to the hinge 16 may have a South seeking pole facing upwards. Also coupled to the base 18 is a loop 22 for engaging a strap.

The slider 24 may slide inwards and outwards from the base 18. When slid outwards in a rest configuration, the inner magnet (North seeking) of the slide is aligned with the outer magnet (also North seeking) in the tongue 12, so that the magnets apply an increasing repelling force as the flap 14 is brought near to the base 18 when closing. The effect is similar to that obtained with a sprung loaded hinge, and provides a quality feel to the clasp 10. The magnetic repelling force is, however, relatively small, and may be easily overcome to push the tongue 12 into the housing head 20 at the end of the base 18. Pushing the tongue 12 into the housing head 20 requires overcoming the repulsion between the outer magnet on the tongue 12 and the inner magnet on the housing head 20, bringing these oppositely aligned magnets into close proximity, but also brings a sideways attractive force between the inner magnet on the tongue 12 and the inner magnet of the housing head 20, and a similar attractive force between the outer magnet of the tongue 12 and the outer magnet of the housing head 20, causing the slide 24 to slide inwards to bring the oppositely oriented magnets into alignment and the similarly oriented magnets out of alignment.

The sliding of the catch causes the housing to head 20 to mechanically engage the edge of the tongue 12 holding the clasp 10 closed mechanically. The magnets and the mechanical lock both function to keep the clasp closed, but with the slide 24 closed, the edge of the housing head 20 engages the tongue 12 and would keep the clasp 10 closed even if there were no magnets present, thus the magnets serve more to prevent the slide 24 from sliding open than to directly keep the clasp 10 closed. In the embodiment shown, there is a tooth protruding from the housing that engages a socket in the tongue and provides the mechanical closing. In other embodiments, the edge of the housing may be beveled and may protrude over the perimeter edge of the tongue and provide the mechanical closing.

Figure 2:
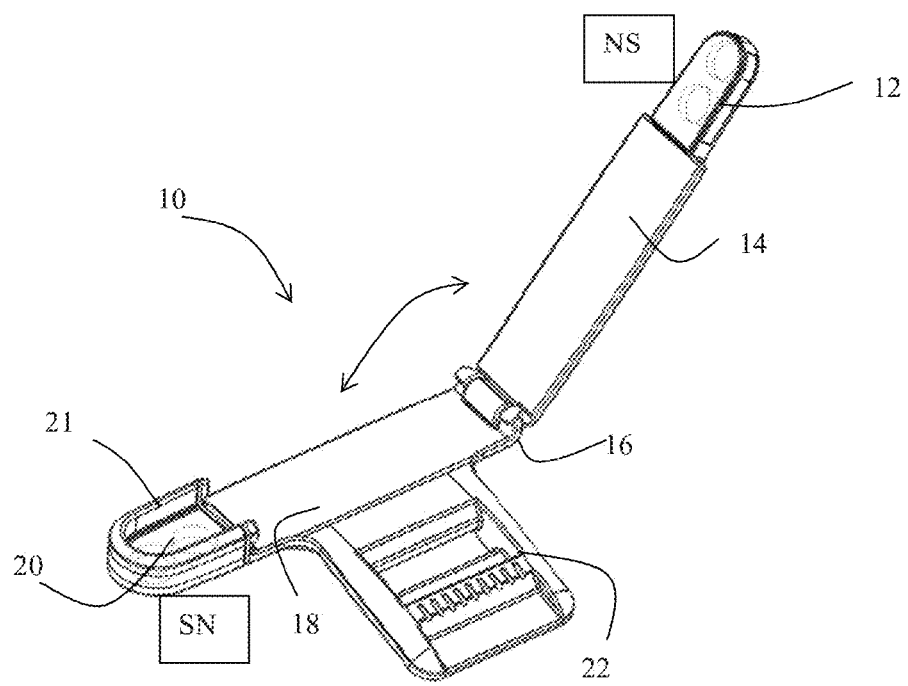
FIG. 2 shows a clasp of the invention in accordance with the embodiment of FIG. 1, having magnets on a slider configured to attract.

FIG. 2 shows the slide 24 closed, with the housing head 20 tight against the base 18. The clasp 10 itself is open.

Figure 3:
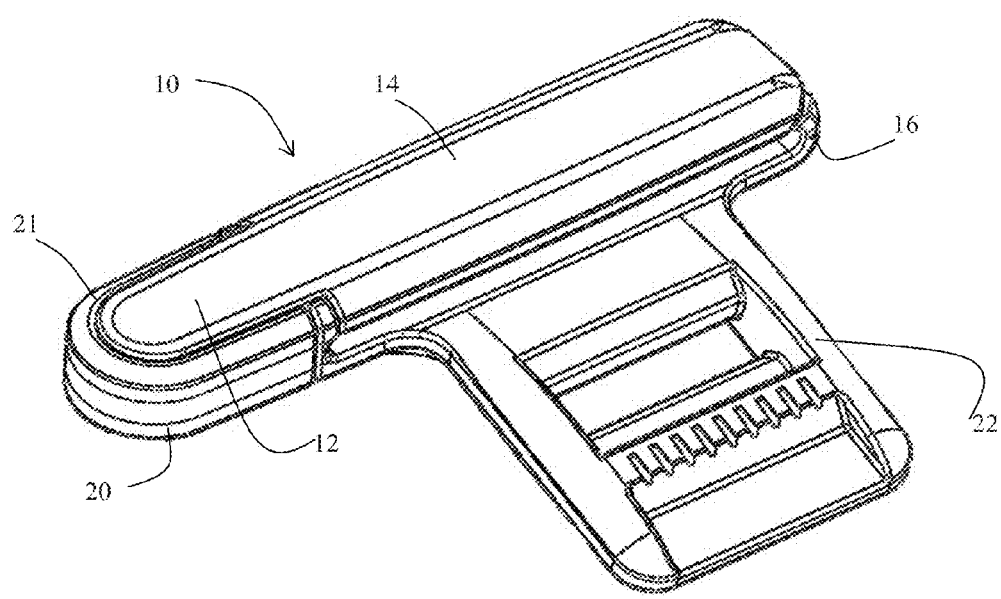
FIG. 3 shows the clasp of FIG. 1 closed and locked.

With reference to FIG. 3, the clasp 10 is shown in its closed configuration. The magnets in the slider 24 are in attractive alignment with those in the tongue 12, and the housing head 20 engages the tongue 12, keeping it closed. The aligned magnets do, of course pull the tongue 12 downwards towards the slider 24, but the actual locking of the clasp 10 is mechanical, due to the housing head 20 of the slider engaging the tongue 12. Note, as drawn, the edge of the housing head 20 covers the edge of the tongue 12. Other configurations are possible, such as providing a clip on the housing the slides over the tongue 12.

Figure 4:
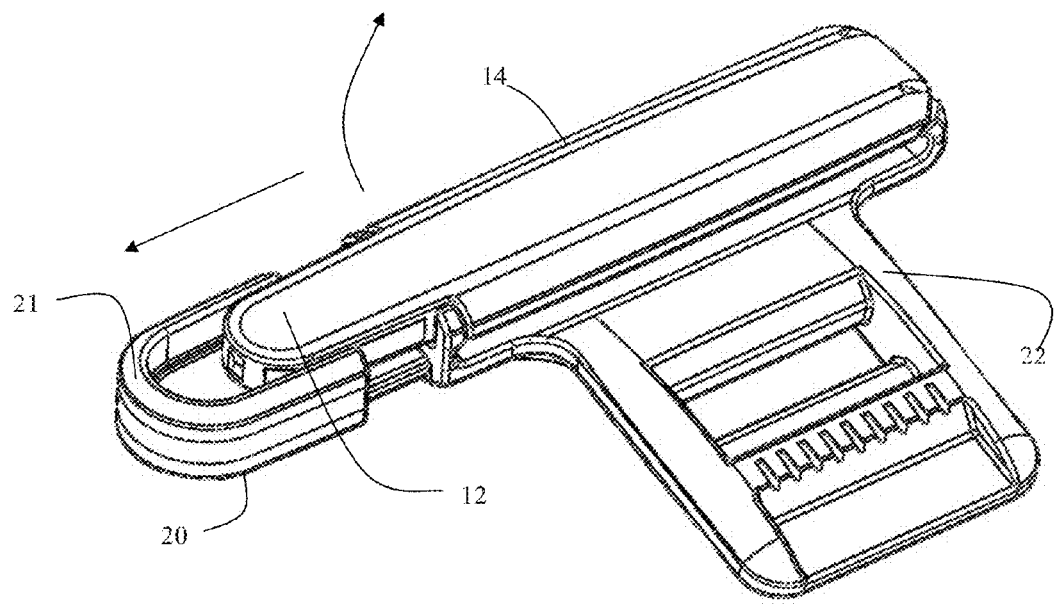
FIG. 4 shows the clasp of FIG. 1 closed but unlocked by displacing the housing, so that the magnets would tend to open the clasp.

Referring to FIG. 4, if the housing head 20 is slid away from the hinge, it no longer covers the tongue 12. Furthermore, the inner magnet on the slider is brought into repelling alignment with the outer magnet on the tongue 12 and the clasp thus springs open, assuming the configuration of FIG. 1.

A strap may be threaded through and fastened to the loop 22, and a second strap may be engaged by clasp 10 between base 18 and flap 14, it being noted that flap 14-hinge 16-base 18-tongue 12 in housing 20 form a closed loop.

Figure 5:
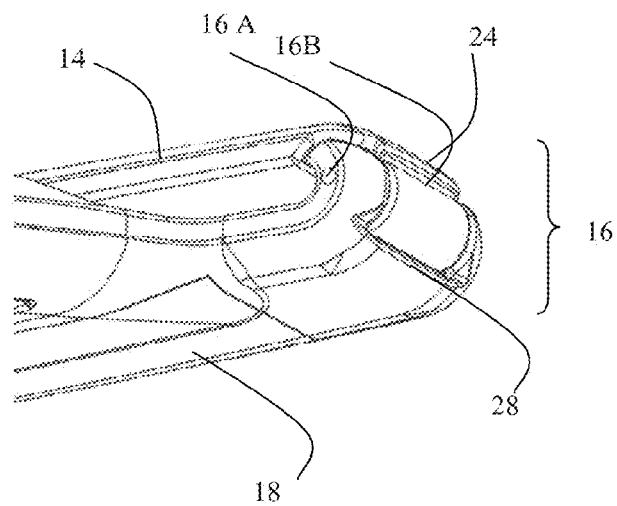
FIG. 5 shows the closed hinge in more detail.
Figure 6:
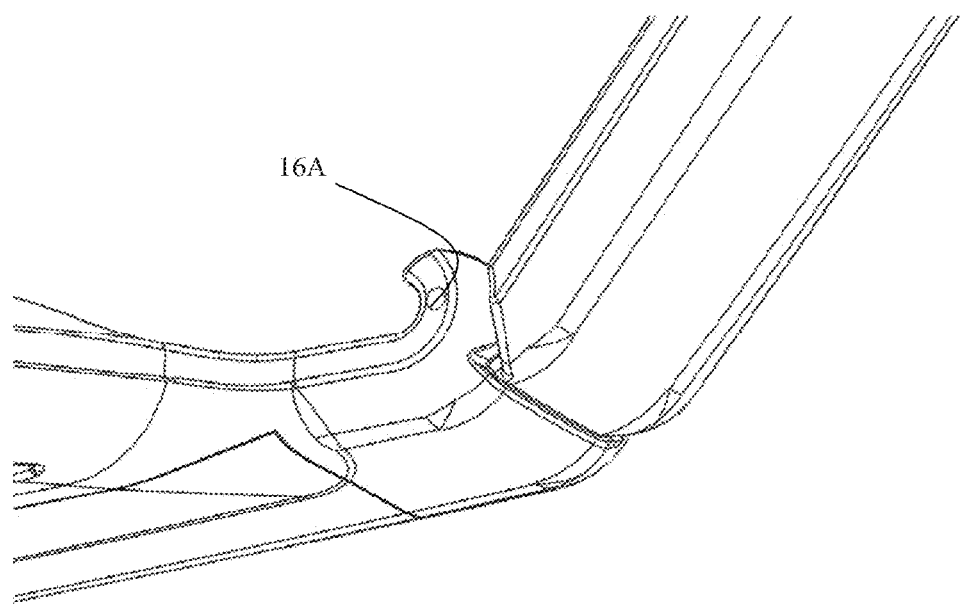
FIG. 6 shows the opened hinge.

With reference to FIG. 5, the hinge 16 consists of a hinge pin 16A coupling the flap 14 to the base 18. The edge 24 of the flap 14 and the edge 28 of base 18 may be configured to meet as the hinge is opened at any desired angle, preventing the hinge 16 opening too widely. As shown in FIG. 6 and FIG. 1, a desired angle may be 135°, for example.

One application for the clip 10 is for engaging a strap of a child's seat to a seatbelt of a car, the strap of the child's seat being threaded through the loop 22, and the seatbelt being engaged by clip 10, between base 18 and flap 14.

Figure 7:
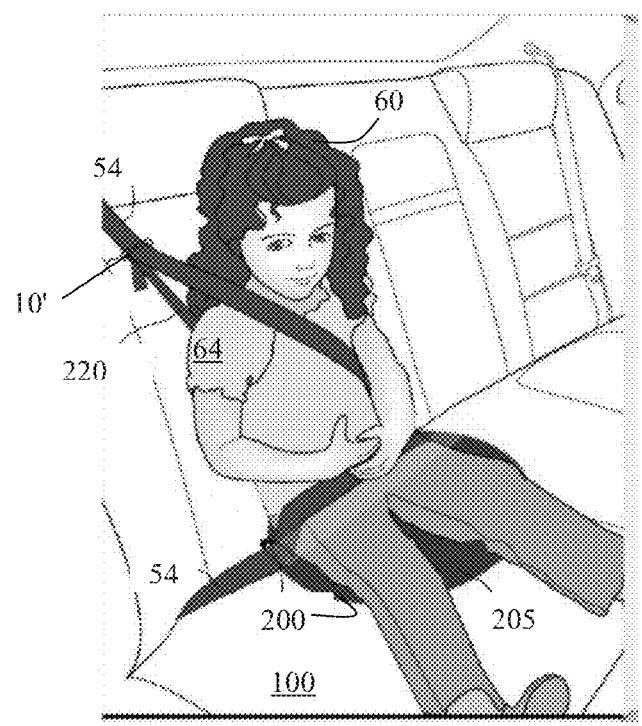
FIG. 7 shows a child on a car seat where a clasp in accordance with one embodiment is used to attach a strap of a child booster seat to a car seatbelt to adjust the seatbelt to fit the child.

With reference to FIG. 7, a child 60 is shown, sitting on a child seat 200 that enables the adult three-point seatbelt arrangement to be adjusted to comfortably secure the child 60. The child seat 200 consists of a mat 205 placed on the seat 100 of the vehicle, with a strap 220 attached to the mat 205 positioned rearwards. Strap 220 extends upwards and the clasp 10' coupled thereto may be clipped onto sash section 54 of seatbelt 12, above the shoulder 64 of the child 60. In this way, the sash section 54 is held downwards and correctly positioned across the shoulder of the child. The side catch 215a (215b not shown) are proximate to the thighs of the child 60 and hold the lap section 54 of the strap down across the lap. The clasp 10' may be the clasp 10 described hereinabove.

Thus the present invention is directed to a locking device consisting of a flap and catch, wherein the flap is configured to swing towards a base and a tongue at the end of the flap is configured to swing into a housing where it is locked in place using a mechanical catch.

Such flap and catch locks are widely used for various purposes including holding cases closed. The locking device is not merely mechanical, in that the tongue of the flap includes magnets as does the housing. Instead of being configured to magnetically close the flap, like magnets on cupboard doors, the magnetic tongue and housing are configured such that to swing the flap into the housing requires overcoming a repulsive magnetic force. This is achieved by providing a pair of magnets incorporated in the flap such that one has a North seeking pole and one has a South seeking pole facing the housing. The housing has a pair of magnets in similar configuration, such that a South seeking pole opposes the South seeking pole and a North seeking pole opposes the North seeking pole. The repulsive force is a little like a sprung loaded hinge. However, once the repulsive magnetic force is overcome, the closed flap is locked in place since the magnets of the housing are attached to a slide which experiences a sliding force towards the hinge, and brings the like-polarity magnet on the slide out of alignment with the like-polarity magnetic of the flap, and the opposing polarity magnet of the housing into alignment with that of the flap, and, in addition to the magnetic attraction, a catch on the slider holds the flap in the housing. Releasing the catch by sliding the slider away from the hinge, brings the like magnets into alignment and causes the flap to swing open. The hinge may be attached to the housing so that the flap and housing are hinged together. Alternatively, the housing may be fixed to a lid and the flap attached by a hinge to a chest or case, so that when the case is closed, and the flap swung on the hinge towards the housing, it is repelled by the magnets.

In the present invention, the magnets repel closing and then are shifted to hold the clasp closed, but it is not the magnets that providing the closed holding force. Rather the sliding of the magnets causes a mechanical clip on the slider to engage the hinged flap. Thus the holder is locked closed mechanically.

In an alternative embodiment, not shown, the clasp is configured so that the slider is extended when the clasp is closed and the magnets are in attractive alignment, whereas pressing the edge of the housing towards the tongue brings the magnets into repulsive alignment and releases the clasp.

As shown, the clasp 10 may be used to hold a strap to a second strap attached to the clasp 10 by being threaded through loop 22.

The clasp 10 may be used for closing a watch strap, for example.

Clasps of the invention may be applied to footware, such as ski boots, for example.

It will be appreciated that in other embodiments, the loop 22 could be dispensed with and the base 18 of the clasp 10 could be permanently attached to a case or a box. The clasp between the base 18 and flap 14 could, for example, hold the bow of a stringed instrument such as a violin, viola, cello or double-base. The magnetic sliding principle could be incorporated in two part clasps, where a base 18 is permanently attached to a case with a hinged lid, and the flap 14 may be hinged by a hinge 16 to a lid of the case, so that when the lid of the case is closed, the flap 14 is aligned in proximity with the base 18 so that the tongue 12 is magnetically repelled from a housing head 20, but if the magnetic repulsive force is overcome, the housing will slide to lock the tongue in place with a sideways magnetic force holding the lock closed. Such a clasp may be usefully applied to a display case, a cupboard or cabinet, for example.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A locking device comprising a flap that is configured to swing on a hinge towards a base, the flap having a tongue at a distal end thereof and the base having a housing at a distal end thereof, wherein if the tongue is forced into the housing said tongue is locked in place within the housing by a lip of the housing serving as a mechanical catch that extends over the tongue; the flap and the housing are each provided with a pair of magnets such that the pair of magnets on the flap are fixed to the flap, whereas those on the housing are attached to a slider that is able to slidingly reciprocate between an open position and a closed position, such that when the slider is in the closed position, the mechanical catch engages the tongue, and when the slider is in the open position, the mechanical catch does not engage the tongue, the slider being configured to naturally assume an open configuration, such that whilst the flap swings towards the base, the slider assumes the open position and the magnets on the slider are mounted in repelling configuration with respect to the magnets on the flap to provide a repellant force that tends to urge the flap away from the housing opposing the closing of the hinge, however, when the flap is positioned within the housing in a closed position, the magnetic attraction of the magnets on the flap for the magnets on the slider cause the slider to slide into the closed position wherein the mechanical catch engages the flap and holds the flap closed, such that sliding the slider to release the mechanical catch brings the magnets on the slider into repelling alignment with the magnets on the flap causing the flap to spring open.

2. The locking device of claim 1 wherein the flap is hinged to the housing.

3. The locking device of claim 1, wherein a loop for a strap is coupled to the housing.

4. The locking device of claim 1, wherein closing the flap into the housing creates a closed loop for engaging a strap.

* * * * *